Patented Mar. 16, 1926.

1,577,189

UNITED STATES PATENT OFFICE.

WALTER A. PATRICK, OF BALTIMORE, MARYLAND.

GELS FOR CATALYTIC AND ADSORBENT PURPOSES.

No Drawing. Original application filed February 28, 1920, Serial No. 362,138. Divided and this application filed May 24, 1924. Serial No. 715,727.

*To all whom it may concern:*

Be it known that I, WALTER A. PATRICK, a citizen of the United States, and resident of Baltimore, State of Maryland, have invented certain new and useful Improvements in Gels for Catalytic and Adsorbent Purposes, of which the following is a specification.

The present invention, which is a division of my application 362,138 filed Feb. 28, 1920, relates to adsorbent gels having chemically active or catalytic agents associated therewith.

In my Patent No. 1,297,724 I have disclosed the method of making a hard highly porous silica gel stable up to 700° centigrade having ultramicroscopic pores. It is the principal object of the present invention to produce gels similar in physical structure to the gels described in the above patent, but which possess special properties due to the incorporation of other substances.

The present invention comprehends gels of hard, stable, porous structure having ultramicroscopic pores and also having associated therewith one or more members of the class of catalyzers containing metallic elements.

From a chemical standpoint it is very desirable to have certain substances in a physical structure similar to that of a porous gel such as silica gel described in the aforesaid patent. Silica is an inert substance chemically, and for this reason is admirably suited for adsorbing and recovering gases and vapors, provided of course that it is given the proper structure. On the other hand, other substances, such as certain metallic oxides and metals are known to possess desirable chemical and catalytic properties. If these metals and metallic oxides can be obtained with a structure similar to that of the gel described in the patent, the above properties are enhanced and made more active, because of the large surface presented. According to the present invention it is possible to obtain a gel of the structure disclosed in the patent having one or more of the members of the class of catalyzers containing metallic elements incorporated therewith.

In the preparation of silica gel as described in the patent, use is made of the reaction between a soluble silicate and an acid to produce colloidal silicic acid. It is found necessary to allow the silicic acid to set to a hydrogel in a medium of certain definite acid concentration in order to insure a gel of the proper structure. The concentration of the acid is from about three-tenths to nine-tenths gram ions of hydrogen per litre, the preferred concentration being about five-tenths gram ions of hydrogen per liter.

One method of preparing gels according to the present invention utilizes hydrolysis of metallic salts to secure the proper acid concentration for the setting of the colloidal silicic acid. For example, if a solution of water glass of the proper concentration be mixed with a solution of ferric chloride, the mixture will set to a hydrogel, which can be washed free of chlorides with substantially no loss of iron, and the resulting hydrogel when dried as describel in my patent, is found to consist of a mixture of silica and ferric oxide, together with the usual quantity of water. Wide variation of the ratio of ferric oxide to silica may be obtained by proper selection of the concentration and volumes of water glass and ferric chloride solutions. The resulting gel adsorbs gases and vapors, with which it does not interact chemically to the same degree as the plain silica gel of the patent. On the other hand, the addition of the ferric oxide increases the power of the gel for adsorption of gases and vapors with which it may chemically combine. The iron oxide also adds catalytic properties to the gel. For example, the reaction between sulphur dioxide and oxygen is markedly catalyzed by the mixture of $Fe_2O_3$ and $SiO_2$, while the silica gel itself is without effect on the velocity of the above reaction.

This invention is in no wise limited to the above example, for it is possible to secure a great number of mixtures of metallic oxides with silica and similar substances by the application of the above principle. Thus aluminum oxide may be obtained intermixed with silica possessing a gel structure, providing solutions of aluminum chloride and water glass of the proper concentrations be mixed. Likewise a gel including thorium oxide may be similarly obtained. Accordingly if a solution of ferric chloride and copper chloride be mixed with water glass, under proper conditions a hydrogel will result which can be washed free of chloride with substantially no loss of copper. The dried gel will be found to consist of a mixture of ferric oxide, copper oxide and silica. In this manner it is possible to obtain a great variety of different gels including one or more metal bearing materials in their composition. For example, the following have been prepared and are cited as examples, although it is to be distinctly understood that the invention is not limited to the compositions mentioned below:

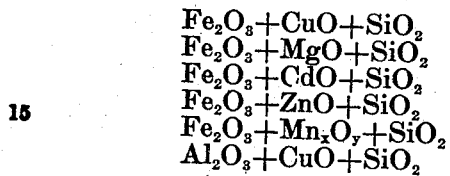

It is also possible to prepare gels of metallic salts that are not as easily hydrolyzed in water as the above, it being found that upon setting of the hydrogel, it is possible to wash the material free of the acid radical, thereby completing the hydrolysis. This action has been explained by F. G. Donnan in his papers on membrane permeability published in volume 2 of System of Physical Chemistry by W. C. McLewis, page 275. For example, if a mixture of copper chloride, water glass and hydrochloric acid be prepared of such a nature that the whole will set to a hydrogel, it is found that it is possible to entirely free the mixture of chlorides by washing without loss of much copper. The loss of copper in the washing depends upon the amount of acid used in the original mixture.

By the application of this principle, which in the end amounts to the same thing as in the previously cited cases, it is possible to prepare gels having one or more of the heavy metallic oxides mixed with silica or similar substances. In the first mentioned examples, the necessary acid was derived from the hydrolysis of the strongly hydrolyzed salts of heavy metals e. g. $AlCl_3$, $FeCl_3$, etc., while in the latter example the acid was supplied as such.

It is easily possible to reduce a mixture of certain of these oxides to a metallic state, and in this way obtain a mixture of silica and finely divided metal, the whole possessing a structure analogous to silica gel. For example, the following gels comprising silica and a finely divided metal have been prepared, by reducing the corresponding metallic oxide gels with hydrogen at a low temperature.

According to the first process described herein, a silicate solution and a solution of a readily hydrolizable salt of a heavy metal are mixed. According to the second method described herein, a silicate solution, acid solution, and a solution of a salt of a heavy metal are mixed. If improper proportions are taken a precipitate will result and the product of the present invention not be obtained. On the other hand, if the proper proportions and quantities are taken, the mixture gradually hardens into a hydrogel. This hydrogel by washing and drying is converted into the highly porous gel of the present invention. The precipitate mentioned above after being washed and dried may be the same chemically as the gel, but it does not have the same porous structure. The gel has much finer pores than the dried precipitate, and consequently the internal surface of the gel is many times as extensive as the internal surface of the dried precipitate. It is because of this extensive surface that these gels are so active catalytically. In preparing the gels, the liquid after mixing should have an acid concentration of three-tenths to nine-tenths gram ions of hydrogen per litre. The product of this invention is a hard glassy material having a porous structure substantially like that of silica gel and consisting of two or more colloidal oxides, or oxides and metals.

From the foregoing it is apparent that according to the present invention it is possible to obtain hard adsorbent gels including a metal or metals or one or more metallic oxides, this mixture being obtained from a metallic salt and a silicate. Furthermore it will be observed that while silica is a chemically inert substance, the metals and metallic oxides which are incorporated in the gel according to this invention are chemically active as compared to silica and also possess catalytic properties.

The term "gel" as used in the specification and claims designates a hard porous material having a porous structure similar to that of the silica gel obtained by the process described in Patent No. 1,297,724.

The term "metal" as used in the claims is not intended to include silicon and the term "metal bearing material" is used to designate a metal by itself as well as compounds thereof.

It is to be distinctly understood that any equivalent substance may be substituted for the sodium silicate and although the silicate has been referred to throughout the specification in connection with the preparation of the gel, this is merely illustrative of the class of substances that can be used to obtain the porous catalytic product of this invention.

Having thus described the invention what is claimed as new and desired to be secured by Letters Patent is:

1. A hard stable adsorbent and catalytic non-precipitated gel having ultramicroscopic pores comprising a composition including silica and a metallic oxide.

2. A hard stable adsorbent and catalytic non-precipitated gel having ultramicroscopic pores comprising a composition including silica and a plurality of metallic oxides.

3. A hard stable adsorbent non-precipitated gel having ultramicroscopic pores comprising a composition including a catalytic agent in addition to the gel.

4. A hard stable and adsorbent non-precipitated silica gel having ultramicroscopic pores and having a metal bearing material incorporated therewith.

5. A hard stable adsorbent non-precipitated gel having ultramicroscopic pores and having a finely divided catalytic agent associated therewith.

6. A hard stable adsorbent non-precipitated gel having ultramicroscopic pores and comprising a composition including a member of the class of catalyzers containing a metal.

7. A hard stable adsorbent non-precipitated gel having ultramicroscopic pores and comprising a composition including silica and a member of the class of catalyzers containing a metal.

8. A hard stable non-precipitated gel having ultramicroscopic pores impregnated with at least one metallic oxide.

9. A hard porous non-precipitated gel having ultramicroscopic pores impregnated with a metal bearing material.

10. A hard stable vitreous material having a porous structure substantially the same as silica gel and consisting of two or more colloidal oxides.

11. A hard glassy material having a porous structure substantially the same as silica gel and consisting of a colloidal oxide and at least one metal bearing material.

12. A hard glassy material having a porous structure substantially the same as silica gel and consisting of two or more colloidal oxides, at least one of which is an oxide of a metal.

13. A hard glassy material having a porous structure substantially the same as silica gel and consisting of a colloidal oxide and iron oxide.

14. A hard glassy material having a porous structure substantially the same as silica gel and consisting of a colloidal oxide, iron oxide and copper oxide.

15. A hard, stable, adsorbent non-precipitated silica gel having ultra-microscopic pores and having iron oxide and copper oxide associated therewith.

In testimony whereof I hereunto affix my signature.

WALTER A. PATRICK.